Nov. 17, 1936.  A. W. KIMBELL  2,061,467
FASTENER SECURED INSTALLATIONS AND FASTENERS FOR THE SAME
Filed Feb. 27, 1935
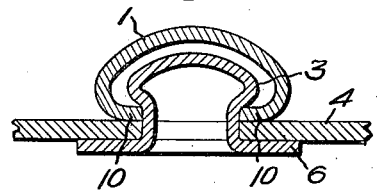
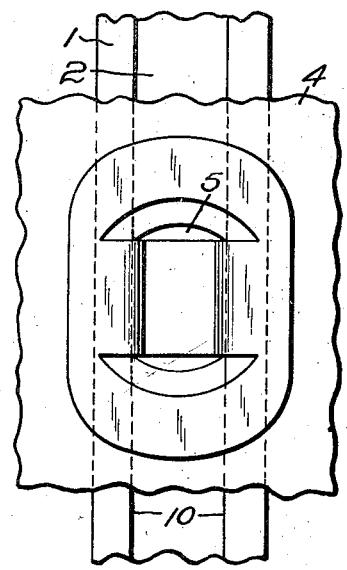
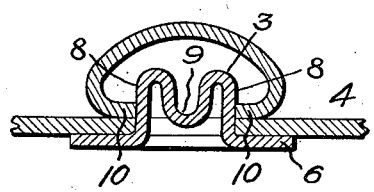
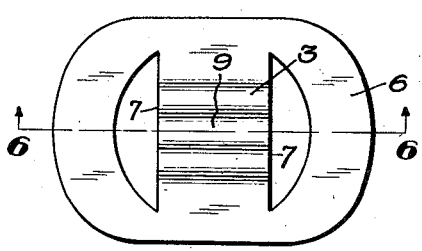
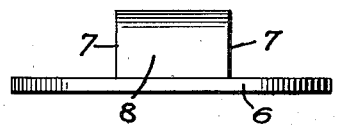
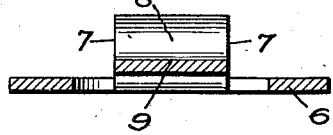
Inventor:
Arthur W. Kimbell,
by Walter S. Jones
Atty.

Patented Nov. 17, 1936

2,061,467

UNITED STATES PATENT OFFICE 2,061,467

FASTENER SECURED INSTALLATIONS AND FASTENERS FOR THE SAME

Arthur W. Kimbell, Newton Center, Mass., assignor to United-Carr Fastener Corporation, Cambridge, Mass., a corporation of Massachusetts Application February 27, 1935, Serial No. 8,542

1 Claim. (Cl. 85—40)

My invention aims to provide improvements in the construction and manufacture of fastener secured installations and fasteners for the same.

In the drawing which illustrates a preferred embodiment of my invention:

Figure 1 is a section through an installation of a molding strip with my improved fastener in locked position;

Fig. 2 is a plan view of an installation of a molding strip showing a fastener member in locked position;

Fig. 3 is a section through an installation of a molding strip showing a fastener member in position to be locked;

Fig. 4 is a top plan view of the fastener member illustrated in Figs. 1, 2 and 3;

Fig. 5 is a side view of the fastener member illustrated in Fig. 4; and

Fig. 6 is a section view of the fastener member taken along the line 6—6 of Fig. 4.

My invention as illustrated in the accompanying drawing illustrates particularly, though not exclusively, a simple and compact method of attaching molding strips and the like to the sides of an automobile or other like supporting structure.

The fastener members as illustrated are preferably made of one piece of sheet metal, simple in construction and very easy to manufacture. One of the most important features of the fastener member is its relatively flat base which will allow no appreciable portion of the member to extend beyond the outside of the supporting member thus permitting a comparatively smooth surface on that side.

Another feature of my invention is the rectangular-shaped attaching member which in locked position provides a greater bearing surface on the stud-receiving element than the ordinary circular shaped rivet type fastener.

The particular parts chosen to illustrate the preferred embodiment of my invention as shown in the drawing includes a molding strip, such as is now frequently used on the bodies of automobiles and elsewhere, and a relatively thin supporting member.

The molding strip 1 is of the type having a rectangular-shaped aperture 2 running the entire length of one of its sides of a width great enough to permit passage of the attaching portion 3 of the fastener member. The supporting member 4 (Figs. 1, 2, 3) is of relatively thin material with an aperture 5 designed to receive the attaching portion only of the fastener member.

Each fastener member is preferably formed from a single piece of sheet metal and has a flat base portion 6, and an attaching portion 3. The attaching portion is pressed from the base and has two of its opposed sides 7—7 free from the base portion as shown in Fig. 4 and Fig. 6. A portion of the base 6 adjacent to the sides 7—7 of the attaching member may be cut away as shown in Fig. 4 to allow the freedom to the opposed sides 7—7. The sides 8—8 of the attaching portion are an extension of the base 6, are rectangular in shape and project nearly perpendicular to the base portion. Closing the top of the attaching portion 3 is an inwardly bulged bottom 9 extending in the form of a fold the width of the attaching portion.

Assembly of the component parts of the installation is a relatively simple matter. The aperture 5 of the supporting member is superposed upon the rectangular-shaped aperture 2 of the molding strip, as illustrated in Figs. 1, 2 and 3. The attaching portion 3 of the fastener member is inserted through the aperture 5 of the supporting member 4 and into the rectangular-shaped aperture 2 of the molding strip 1. The sides 8—8 of the attaching portion are expanded by inserting a tool through the aperture 5 and pressing or driving this tool inwardly against the bulged bottom 9. If sufficient force is applied to flatten the bulged portion of the bottom the sides 8—8 will be laterally expanded sufficiently to bear on and overhang the walls 10—10 surrounding the rectangular aperture of the molding strip, thus anchoring the fastener securely in the work, as shown in Fig. 1. By this fastening method access to the rear wall in which the attaching portion of the fastener member is located is unnecessary.

This method of fastening is desirable because the fasteners do not first have to be assembled with the molding as with other known types of fasteners. Thus there is eliminated the necessity for alignment of fasteners with apertures in a supporting structure.

While I have illustrated and described a preferred embodiment of my invention, I do not wish to be limited thereby, because the scope of my invention is best defined by the following claim.

I claim:

A rivet-like fastener member for attaching moldings and the like to a support, said fastener member being formed from a single piece of sheet metal and having a base, a rectangular-shaped hollow expansible attaching portion extending from said base and having a fold extending from the bottom thereof toward said base, two opposed sides of said attaching portion and portions of said base adjacent thereto being open to provide freedom for expansion of the attaching portion when said fold is pressed in a direction away from said base, and said base being continuous adjacent to its periphery to maintain in position the flat side walls of said attaching portion during expansion of the fold of the bottom of said attaching portion as and for the purposes illustrated and described.

ARTHUR W. KIMBELL.